United States Patent [19]

Bernhardt et al.

[11] Patent Number: 4,625,006

[45] Date of Patent: Nov. 25, 1986

[54] ADHESIVIZING AGENT COPOLYMERS CONTAINING BOTH ACRYLATE OR METHACRYLATE GROUPS AND ALKOXYSILYL GROUPS

[75] Inventors: Günther Bernhardt, St. Augustin; Horst Hanisch, Hennef, both of Fed. Rep. of Germany

[73] Assignee: Dynamit Nobel Aktiengesellschaft, Cologne, Fed. Rep. of Germany

[21] Appl. No.: 668,697

[22] Filed: Nov. 6, 1984

Related U.S. Application Data

[63] Continuation of Ser. No. 516,258, Jul. 22, 1983, abandoned.

[30] Foreign Application Priority Data

Jul. 23, 1982 [DE] Fed. Rep. of Germany ....... 3227552

[51] Int. Cl.$^4$ .................... C08F 230/08; C08F 218/60
[52] U.S. Cl. ................................ 526/279; 526/292.95
[58] Field of Search ........................... 526/292.95, 279; 525/330.7, 386

[56] References Cited

U.S. PATENT DOCUMENTS

| | | | |
|---|---|---|---|
| 3,488,331 | 1/1970 | Jorgensen, Jr. | 526/291 |
| 3,707,518 | 12/1972 | Bemmel et al. | 526/279 |
| 3,923,703 | 12/1975 | Fukutani et al. | 525/330.7 |
| 4,112,213 | 9/1978 | Waldmon | 526/279 |
| 4,308,014 | 12/1981 | Kawahara et al. | 526/279 |
| 4,326,049 | 4/1982 | Rosmussen | 526/91 |

*Primary Examiner*—Joseph L. Schofer
*Assistant Examiner*—Peter F. Kulkosky
*Attorney, Agent, or Firm*—Felfe & Lynch

[57] ABSTRACT

The present invention relates to copolymers which can be used as adhesion mediating agents (adhesivers) between polymers and inorganic-oxide material. They are characterized by a reactive alkoxysilyl group and an acrylic or methacrylic acid moiety. Each of these two groups is linked to a fundamental constituent having two chain carbon atoms, this fundamental constituent being constructed on a compound having an ethylenically unsaturated group as monomer. The ratio of the alkoxysilyl groups to the acrylic or methacrylic acid esters in the new copolymers can be established as desired, for example by copolymerizing the copolymers with other compounds having ethylenically unsaturated groups, which do not have the above-named moieties. The present invention also relates to a method of preparing these new copolymers as well as intermediates which occur in the practice of this method, as formerly unknown products.

8 Claims, No Drawings

ADHESIVIZING AGENT COPOLYMERS CONTAINING BOTH ACRYLATE OR METHACRYLATE GROUPS AND ALKOXYSILYL GROUPS

This application is a continuation of application Ser. No. 516,258, filed July 22, 1983 and now abandoned.

BACKGROUND OF THE INVENTION

The subject matter of the present invention is new copolymers useful as adhesion mediating agents and having at least two fundamental constituents which have two chain carbon atoms, one of the fundamental constituents containing an alkoxysilyl group. Also subject matter of the present invention is copolymers which occur in the production of these new polymeric adhesion mediating agents ("adhesivizers") and a method for the preparation of the new polymeric adhesivizers from these new copolymers which occur as intermediate products.

German Pat. No. OS 2,624,888 has already disclosed copolymers in which one of the fundamental constituents with two chain carbon atoms contains an alkoxysilyl group which is directly linked to the fundamental constituent. Ihe additional ethylenically unsaturated fundamental component having two chain carbon atoms, however, is attached to only one acid group or acid anhydride group or ester group. These compounds are not suitable for use directly as adhesivizers between polymers and inorganic oxide material. They produce an appreciable adhesivizing action only when they are used in mixtures with organofunctional silanes.

It is furthermore known, for example through German Pat. No. 1,270,716, that organofunctional alkoxysilyl compounds containing an acrylic or methacrylic group as a functional group, have good adhesive ability between fillers and polymers. The use of these compounds as adhesivizers, however, is limited by the fact that the methacrylate component in the molecule is present in a relatively high concentration, so that these compounds, if uniformly distributed in the polymer-and-filler mixture that is to be bonded, are often used in an excessively great concentration. In many cases the strength of adhesion to the polymer would be just as well promoted or increased by a lower concentration of acrylate groups with respect to the alkoxysilyl groups.

The object of the invention therefore was:
(a) to make available a new class of adhesivizing agents containing both acrylate or methacrylate groups and alkoxysilyl groups, in which the concentration of acrylate or methacrylate groups and alkoxysilyl groups can be varied absolutely or relative to one another over a wide range, and which
(b) will have at least as good an adhesivizing action as the silanes of German Pat. No. 1,270,716. Another object was to discover a method of preparing such adhesivizing agents.

For the achievement of this object, copolymers have been discovered which contain at least two different fundamental constituents, each containing two chain carbon atoms, and one of these constituents being attached to an alkoxysilyl group. They are characterized in that one fundamental constituent contains an alpha-halogen carboxylic acid moiety whose halogen atom can be replaced in some cases by an acrylic or methacrylic acid moiety, and in that, in the case of the second fundamental constituent, the alkoxysilyl moiety is connected to the fundamental constituent either directly or through a group

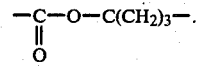

A process has furthermore been found for the preparation of those copolymers, in which one of the fundamental constituents contains an acrylic or methacrylic acid moiety. This process is characterized in that copolymers of the invention having fundamental constituents with two chain carbon atoms each, in which one constituent is linked with an alpha-halogen carboxylic acid moiety, are reacted with an alkali or alkaline earth salt of acrylic or methacrylic acid.

Copolymers of the invention, in which one of the fundamental constituents is linked to an acrylic or methacrylic acid moiety, prove to have an excellent adhesivizing action between inorganic oxide materials and polymers. This action occurs not only when the fundamental constituent having the acrylic or methacrylic acid moiety is present in the polymer in an amount of as little as 0.5 wt.-%, but also when it is present in amounts of as much as 99.5 wt.-%. All values between these are possible.

It is therefore possible in accordance with the invention for the new copolymers to contain additional, known fundamental constituents having two chain carbon atoms which do not contain any acrylic or methacrylic acid moiety nor any alkoxysilyl moiety. Such additional fundamental constituents can be in the polymer in such a maximum amount that the percentage of the fundamental constituents which do have alkoxysilyl and (meth)acrylate groups amounts in each case to at least 0.5% by weight.

The fundamental constituents containing the alphahalogen carboxylic acid moiety are derived from alpha-chloro or alpha-bromo fatty acid vinyl esters. The fatty acid moiety is preferably one having two or three carbon atoms, although higher fatty acids of up to 18 carbon atoms can be used. Preferred monomers are the alpha-chloro or alpha-bromo acetic acid vinyl esters.

The fundamental constituents containing an alkoxysilyl group are, on the one hand, the same as those contained in the compounds of German Pat. No. OS 2,624,888. Additionally, however, in these constituents the alkoxysilyl moiety can be linked to these constituents by a

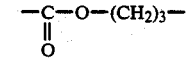

group to one of the carbon atoms of the fundamental constituent, as for example in the case of gamma-methacryloxypropyltrimethoxysilane. Examples of monomers from which these basic constituents are formed are the vinyltrialkoxysilanes whose alkoxy groups have preferably up to 4 carbon atoms, such as vinyltrimethoxysilane, vinyltriethoxysilane, vinyl-tris-(2-methoxyethoxy)-silane and gamma-methacryloxypropyltrimethoxysilane.

The additional basic constituents that may be contained in some cases in the copolymers of the invention, and which contain neither an acrylate or methacrylate nor an alkoxysilyl group, are derived from monomers which are copolymerizable with the ethylenically unsaturated monomer containing the alkoxysilyl group as well as with an ethylenically unsaturated monomer containing the alpha-halogen carboxylic acid moiety, examples being vinyl acetate, vinyl propionate, vinyl laurate, vinyl stearate, diethylmaleinate, diethyl fumarate, maleic acid anhydride, ethyl acrylate and methyl methacrylate. These groupings, also referred to herein as nonfunctional basic constituents, can be characterized by the following formulas:

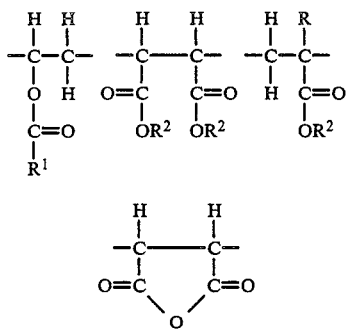

wherein R represents hydrogen, methyl or ethyl, $R^1$ hydrogen or a $C_1$ to $C_{18}$ alkyl moiety, and $R^2$ hydrogen or a $C_1$ to $C_4$ alkyl moiety. The person skilled in the art will be familiar with suitable nonfunctionalized vinyl monomers as starting products for the corresponding fundamental constituents in the copolymers.

The copolymers of the invention can furthermore contain, if desired, in addition to or instead of the copolymerized nonfunctionalized monomers, up to 99% by weight of an additional functionalized monomer which makes a polymer soluble or emulsifiable in water, examples being N-vinylpyrrolidone, methylvinyl ether, N-vinylmorpholinone-3, N-vinyl-1,3-oxazidinone-2, or ethylenically unsaturated compounds which are capable of later forming salts with acids or bases through functional groups, but do not react with the alkoxysilyl group or the halogen function or the acrylate or methacrylate function, examples being maleic acid anhydride, itaconic acid anhydride, and 2-diethylaminoethylacrylate or -methacrylate.

The ethylenically unsaturated monomers on which the fundamental constituents are based can easily be copolymerized by known free-radical methods. The initiators used for the polymerization are compounds known for the purpose, such as organic peroxides or azoisobutyric acid dinitriles, for example. The following are given as examples: benzoyl peroxide, diacetyl peroxide, methylethylketone peroxide, methylisobutylketone peroxide, cyclohexanone peroxide, cymene hydroperoxide, tert.-butylhydroperoxide, di-tert.-butylperoxide, dicumyl peroxide, 1,3-di-tert.-butylperoxyisopropylbenzene, tert.-butylperacetate, tert.-butylperoctoate, tert.-butylperpivalate, tert.-butylisononanate. The catalyst is added in amounts of 0.2 to 3 percent of the weight of the ethylenically unsaturated monomer, which usually suffices for the achievement of a reasonable rate of reaction and a high monomer transformation.

The polymerization to the copolymers of the invention, in which the carboxylic acid moiety attached to the basic constituent is substituted in α-position by halogen, can be performed in substance, i.e., without the use of a diluent or solvent. Preferably, however, it is a polymerization in solution. Those solvents can be used which in no way interfere with the polymerization or react with the alkoxysilyl group or the halogen-carboxylic acid moiety of the vinyl monomers. Suitable solvents are fatty acid esters, such as for example acetic acid ethyl ester, ketones such as acetone or methyl ethyl ketone or aromatic hydrocarbons, such as for example benzene or toluene. The ratio of vinyl monomers and solvents can amount to between 4:1 and 1:4 by weight.

The said copolymerization is generally performed by placing all the monomers together in the reaction vessel and causing them to react randomly according to their relative concentrations and relative reactivities, so that random polymers are formed. To increase or reduce the inhomogeneity of the polymers, however, one or more of the ethylenically unsaturated monomers can be fed in gradually in the course of the polymerization. It is furthermore also possible to perform the polymerization as a graft copolymerization in which up to 3 of the ethylenically unsaturated monomers corresponding to the fundamental constituents are grafted in a known manner onto a previously formed polymer that contains the rest of the fundamental constituents to be contained in the copolymers of the invention. The nature of these reactions is generally known in the field of free-radical polymerization.

The preparation of the polymers which can act as adhesivizers, and in which a fundamental constituent is attached to a functional acrylic or methacrylic group, is performed by a reaction of alkali or alkaline earth salts of acrylic or methacrylic acid, and copolymers in which one of the fundamental constituents is attached to a halogencarboxylic acid moiety. The alkali acrylates or methacrylates are used in such amounts that, for each gram atom of chlorine in the starting copolymer, 1 to 1.5 gram molecules of the acrylates or methacrylates are available. Preferably this ratio amounts to 1:1.1.

A preferred embodiment of the reaction consists in the use of solutions of the above-named starting copolymers as produced, for example, in the solution polymerization performed for the preparation of the copolymers of the invention having fundamental constituents containing the halogen carboxylic acid moiety. The solvent used in this case, however, can also be replaced entirely or partially, after the polymerization, by another solvent suitable for the reaction.

On account of the peculiar reactivity of the alkoxysilyl group in the corresponding fundamental units, the selection of suitable solvents is greatly limited. In the majority of cases the solubility of the alkali acrylates and methacrylates in the usable solvents is low. This has a disadvantageous effect on the rate of reaction, which therefore is generally very slow.

In further development of the present invention, this disadvantage is overcome by performing the reaction with the acrylates in the presence of phase transfer catalysts. Examples of suitable phase transfer catalysts are crown ethers or especially quaternary ammonium or phosphonium salts, such as tetrabutyl ammonium chloride, tetrabutyl ammonium bromide, tetraphenyl phosphonium bromide, trimethylbenzyl ammonium bromide, methyltricaprylyl ammonium chloride. Examples of usable crown ethers are 12-crown-4, 24-crown-8, dibenzo-18-crownether-6. Additional usable crown ethers and ammonium or phosphonium salts are known to the chemist from the literature.

The polymer solutions used in the reaction with the alkali acrylates and methacrylates can contain residual amounts of the initiator used in their preparation. The presence of these initiators can lead to difficulties in the reaction with the alkali acrylates if the polymer constituents containing acrylate or methacrylate are provoked to intramolecular crosslinking reactions with the formation of three-dimensional networks. This intramolecular crosslinking, however, is to be prevented insofar as possible in the preparation of these polymers.

In the production of the adhesivizers of the invention, it is therefore advantageous to make the residual initiators contained in the starting polymers ineffective. This is accomplished in accordance with the invention by heating these polymer solutions prior to the reaction with the alkali or alkaline earth acrylates and methacrylates until the initiators are completely destroyed, at temperatures above the decomposition temperature of the radical-forming substances. The initiators can also be made ineffectual by the addition of stabilizers which act as polymerization inhibitors, such as for example di-tert.-butyl cresol, hydroquinone monomethyl ether, phenol, pyrogallol, hydroquinone or phenothiazine.

The person skilled in the art will be familiar with other suitable stabilizers. If these stabilizers are used in an amount of about 0.01 to 3% of the weight of the polymer, they inhibit the intramolecular crosslinking of the polymeric adhesivizer during its manufacture, its application and its storage.

The reaction with the acrylates or methacrylates need not be complete. It will suffice for the reaction to progress to the extent that the polymer obtained contains at least 0.5% by weight of fundamental constituents to which the methacrylic group is attached.

The copolymers obtained by this reaction act as adhesivizers between polymers and fillers, pigments or dyes. The polymers in question are any which can be modified by free-radical reactions to three-dimensional networks. Examples of such polymers are polyethylene, polypropylene, ethylene-propylene copolymers, ethylene-propylene-dicyclopentadiene terpolymers, polybutadiene, natural rubber, polyamides, polyvinyl alkyl ethers, styrene copolymers such as styrene-butadiene-rubber, vinyl chloride copolymers such as vinyl chloride-vinyl acetate copolymers, ethylenevinyl acetate copolymers, polyesters or unsaturated polyesters, or mixtures of these polymers. The new copolymers are found to have an especially good adhesivizing action in the case of unsaturated polyester compositions, especially when they are used together with copolymerizable solvents. The acid component of the polyester can in this case consist of unsaturated dicarboxylic acids such as fumaric acid, maleic acid, maleic acid anhydride, itaconic acid, and additional saturated dicarboxylic acids such as phthalic acid, isophthalic acid, adipic acid etc. The alcohol component includes bifunctional alcohols such as ethylene glycol, 1,2-propylene glycol, 1,3-butylene glycol, neopentyl glycol etc. Suitable copolymerizable solvents are, for example, styrene, diallyl phthalate, acrylic acid tert.-butyl ester. The polymerizable solvents can amount to as much as 60% of the polyester solution. The fillers, pigments or dyes with which the polymers can be bonded if the claimed new adhesivizers are used include inorganic oxide materials, such as silicon dioxide-containing substances, metals and metal alloys and metal oxides. Examples of substances containing silicon dioxide are glass, quartz, ceramic, sand, brick or tile, asbestos, and clay. In such bonds, suitable metals are principally aluminum, zinc, tin, magnesium, silver and nickel as well as metal alloys such as steel, chromium nickel, bronze, or also metals which have been subjected to a surface treatment with, for example, phosphates. The metal oxides include, for example, aluminum oxide, zinc oxide, titanium oxide, iron oxide and chromium oxide.

The preparation of the bond, between a polymer and the above-named inorganic oxide materials with the aid of an adhesivizer of the invention is performed in a manner known in itself, such as the one described, for example, in German Pat. No. 1,270,716.

EXAMPLES

EXAMPLE 1

In a round flask equipped with a reflux condenser, thermometer, stirrer and gas inlet tube, 88.8 g of distilled vinyl acetate (VAC), 5 g of distilled vinylchloroacetate (VCAC), 6.2 g of distilled vinyltrimethoxysilane (VTMO) and 100 g of distilled acetic acid ethyl ester were weighed in and the flask contents were heated at 75° C. with stirring under a slow stream of nitrogen. Then 0.1 g of azoisobutyric acid nitrile (AIBN) was added. At the end of 2 and 5 hours, an additional 0.1 g of AIBN was added in each case. After a total reaction time of 7.5 hours, 500 ml of toluene was added and the acetic ester was distilled off within 2 hours.

The flask contents were then held at 110° C. for an additional hour. To determine the yield, 1/10 of the weight of the solution was removed and the solvent evaporated at reduced pressure on the Rotavapor. The transformation amounted to 97.5%. The reduced viscosity ($\eta_{red}$) of a 1% solution of the solid in acetic ester was 0.37 (20° C., Ostwald Viscosimeter). The elemental analysis showed a silicon content of 1.18% and a chlorine content of 1.51%.

The rest of the solution, containing 87.75 g of polymer, which corresponds 0.0373 gram atom of chlorine, was diluted with toluene to make 585 grams; 0.9 g of tetrabutylammonium bromide, 0.18 g of tert.-butyl pyrocatechol and 3.86 g (0.041 gram molecules) of solid powdered sodium acrylate were added, and the mixture was held at 110° C. with stirring under nitrogen atmosphere for 3 hours.

The solid was filtered off. The sodium chloride determination by the Volhard method showed 100% of the calculated amount, which corresponds to a complete substitution of the chlorine atoms by acryloxy groups. 100 g of the filtrate was diluted with 260 g of toluene and the mixture obtained was used as a priming solution.

On a film prepared by the casting method, the acrylate double bonding was determined by infrared measurement to be approximately 1640 cm$^{-1}$.

5 microscope slides with degreased surfaces were set at an angle of inclination of about 80° and wetted with the 5% priming solution. After 10 minutes of drying, the primed plates were cured in the drying oven for one hour at 110° C., and a layer 1 mm thick of a boiling temperature-resistant UP resin (Palatal ® A-410, a commercial product of BASF) containing 2 grams of cobalt octoate and 1 g of acetyl acetone peroxide per 100 g UP resin applied to the primed surface.

After one hour of standing at 23° C. under a carbon dioxide atmosphere, the coated microscope slide was treated for 2 hours at 100° C.

Unprimed microscope slides were provided with a UP resin layer in the same manner so as to serve for comparison.

The bond between the resin layer and the glass was tested by immersion in boiling water. In the case of the unprimed slides, the UP resin layer was came off after a few minutes, but in the primed slides, it was still good after 3 hours of boiling.

TABLE 1

| Composition Copolymers Type "B"** Example | VTMO* | VCAC* | VAC* | gram-atoms of reactive Cl per 100 g of polymer | $\eta_{red}$ |
|---|---|---|---|---|---|
| | weight-percent | | | | |
| 2 | 4 | 5 | 91 | 0.0415 | 0.49 |
| 3 | 4 | 10 | 86 | 0.0830 | 0.37 |
| 4 | 4 | 50 | 46 | 0.4149 | 0.34 |
| 5 | 8 | 2 | 90 | 0.0166 | 0.43 |
| 6 | 8 | 5 | 87 | 0.0415 | 0.37 |
| 7 | 15 | 5 | 80 | 0.0415 | 0.28 |
| 8 | 15 | 10 | 75 | 0.0830 | 0.33 |
| 9 | 20 | 5 | 75 | 0.0415 | 0.27 |
| 10 | 20 | 10 | 70 | 0.0830 | 0.28 |

*VTMO: Vinyl trimethoxysilane
VCAC: Vinyl chloroacetate
VAC: Vinyl acetate
**Type B: A copolymer in which one of the ethylenically unsaturated fundamental constituents (i.e., a fundamental constituent having two carbon atoms in the chain) is attached to a halogen carboxylic acid moiety.

EXAMPLES 2 to 10

A number of copolymers were prepared, in which one of the ethylenically unsaturated fundamental constituents is attached to a halogen carboxylic acid moiety. For this purpose, vinyl trimethoxysilane (VTMO), vinyl chloroacetate (VCAC) and vinyl acetate (VAC) were reacted as the ethylenically unsaturated monomer, in the amounts by weight given in Table 1; using the method of radically initiated solution polymerization in accordance with Example 1. The amount of azoisobutyric acid nitrile added portion by portion was made such that a polymerization of 98% or better was achieved. Acetic acid ester served as the solvent, the ratio of the solvent weight to the weight of the monomer mixtures being varied in the individual examples from 4:1 to 1:4. The acetic ester was replaced in the described manner by such amounts of toluene that the percentage of the polymer in the toluenic solution amounted to 15% by weight.

After the addition of 0.2 g of hydroquinone monomethyl ether and 0.5 weight-percent of methyltricaprylammonium chloride, the formation of the polymer with the fundamental constituent containing an acyl group was accomplished by reacting the solution with such amounts of solid, pulverized sodium acrylate that, for each gram atom of chlorine in the starting polymer, there was 1.1 gram molecules of sodium acrylate. At the same time the reaction temperature was kept at the boiling point until more than 90% of the stoichiometrically possible amount of sodium chloride had separated. After this was filtered out, the solid content of the polymer solution obtained was adjusted to 5% by the addition of toluene, and the solution was used as a primer as described in Example 1, and tested. The results of these tests are given in table 1 (on page 19).

EXAMPLE 11

A copolymer containing, as ethylenically unsaturated monomers, 3.3 wt.-% of vinyltriethoxysilane, 5.4 wt.-% of vinylchloroacetate, 40.8 wt.-% of vinyl acetate and 50.5 wt.-% of N-vinylpyrrolidone, was prepared by the solution polymerization method as in Example 1. A toluenic solution containing 100 g of the polymer in 567 g of toluene was reacted with 4.63 g of sodium acrylate in the presence of 1 g of tetrabutylammonium chloride and 0.2 g of hydroquinone monomethyl ether at 110° C. in 3 hours. After filtration, half of this solution was treated with 167 g of toluene, and 500 g of water was added. The resulting emulsion was tested as a primer as in Example 1.

The toluene was evaporated from the second half of the toluenic starting solution and the remainder was dissolved in 950 g of water. The 5% solution thus obtained was also used as a primer and tested.

The test showed that the bond between glass and UP resin was still good in all cases, after 1 hour of immersion in boiling water.

EXAMPLE 12

A copolymer containing as ethylenically unsaturated monomers 10.3 wt.-% of vinyl-tris-(2-methoxyethoxy)-silane, 4.1 wt.-% of vinylchloroacetate and 85.6 wt.-% of vinyl acetate, was prepared by the solution polymerization method in accordance with Example 1. A toluenic solution containing 100 g of the polymer in 567 g of toluene was reacted with 4.64 g of potassium methacrylate in the presence of 1 g of tetrabutylammonium bromide and 0.2 g of p-tert.-butylpyrocatechol at 110° C. for 2 hours. After filtration the solution was diluted with 1333 g of toluene and tested as a primer as in Example 1.

The bond between glass and UP resin was still good after 2 hours of immersion in boiling water.

EXAMPLE 13

A copolymer containing 24.5 wt.-% of methacryloxypropyltrimethoxysilane, 5.5 wt.-% of vinylchloroacetate and 70.0 wt.-% of 2-ethylhexylacrylate was prepared in a toluenic solution by polymerization of the monomers using 2% of benzoyl peroxide and 2% of dodecanethiol (percentages with respect to the sum of the monomers). A toluenic solution containing 200 g of the polymer in 1134 g of toluene was reacted with 9.44 g of sodium acrylate in the presence of 2 g of N-laurylpyridinium bromide and 0.4 g of hydroquinone, at 110° C. for 3 hours. After filtration, 666 g of toluene was added to this solution and tested as a primer in the manner described in Example 1.

The bond between glass and UP resin was still good after 3 hours of immersion in boiling water.

EXAMPLE 14

A copolymer containing, as the ethylenically unsaturated monomers, 5.1 wt.-% of vinyltrimethoxysilane, 90.8 wt.-% of vinyl acetate and 4.1 wt.-% of vinylchloroacetate was prepared by the solution polymerization method described in Example 1. A toluenic solution containing 100 g of the polymer in 567 g of toluene was reacted with 3.52 g of sodium acrylate in the presence of 1 g of tetrabutylammonium bromide and 0.2 g of hydroquinone monomethyl ether at 110° C. for 2 hours. After filtration of the solid, the toluene was evaporated from the solution in a rotatory evaporator.

3 g of the evaporation residue was dissolved in 4.5 g of styrene and the solution was stirred into 92.5 g of a commercial UP resin mixture (Palatal ® A 410).

After the addition of 2 g of cobalt octoate and 1 g of acetylacetone peroxide, enough of the mixture was brushed onto 5 microscope slides to form a coating 2 mm thick. After 1 hour of standing at 23° C. in a carbon dioxide atmosphere, the coated glass slides were cured for 2 hours at 100° C.

After one hour of boiling in water the bond between UP resin and glass was still good.

EXAMPLE 15

A copolymer containing as ethylenically unsaturated monomers 7.0 wt.-% of vinyltriethoxysilane, 4.1 wt.-% of vinylchloroacetate and 88.9 wt.-% of vinyl acetate was prepared by the solvent polymerization method of Example 1. A toluenic solution containing 100 g of the polymer in 567 g of toluene was reacted for 2 hours with 3.52 g of sodium acrylate in the presence of 1 g of tetrabutylammonium bromide and 0.2 g of p-tert.-butyl-pyrocatechol at 110° C. After filtration, this solution was diluted with 1333 g of toluene and tested as a prime coating as in Example 1.

The bond between glass and UP resin was still good after 2 hours of boiling in water.

Example 1 for Purposes of Comparison

A copolymer containing 95.8 wt.-% of vinyl acetate and 4.2 wt.-% of vinyltriethoxysilane was prepared as described in Example 1. A solution containing 50 g of the polymer in 950 g of toluene was tested as a primary coating material (primer).

Upon immersion in boiling water, the UP resin coating separated from the microscope slide in a few minutes.

Example 2 for Purposes of Comparison

A copolymer containing 89.9 wt.-% of vinyl acetate and 10.1 wt.-% of vinylchloroacetate was prepared as in Example 1 and 50 g of the polymer was reacted in 2.84 g of toluene with 4.33 g of sodium acrylate in the presence of 0.2 g of hydroquinone and 0.3 g of tetraphenylphosphonium bromide for 3 hours at 110° C. Then the precipitated sodium chloride was removed by filtration and the filtrate was diluted with 666 g of toluene and used and tested as a primer as in Example 1.

Upon immersion in boiling water, the UP resin coating separated from the microscope slide in a few minutes.

It will be understood that the specification and examples are illustrative but not limitative of the present invention and that other embodiments within the spirit and scope of the invention will suggest themselves to those skilled in the art.

What is claimed is:

1. A copolymer formed by polymerizing at least two different ethylenically unsaturated constituents, each of said constituents having two chain carbon atoms wherein a first of said ethylenically unsaturated constituents is linked with a carboxylic acid moiety through an oxygen atom of said acid moiety, said acid moiety having an α-position carbon atom which is substituted with an acrylic or methacrylic acid moiety; and a second of said constituents having an alkoxysilyl moiety linked to one of the chain carbon atoms of said second constituent directly or through a group

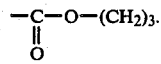

2. The copolymer of claim 1, further comprising a third constituent containing two chain carbon atoms and being joined neither to a halogen carboxylic acid moiety nor to an alkoxysilyl group.

3. The copolymer of claim 2 wherein said third constituent is carboxylic acid vinyl ester; maleic acid, its esters or anhydride; or acrylic or methacrylic acid or its esters.

4. The copolymer of claim 3 further comprising a fourth constituent with two carbon atoms in the chain and rendering the polymer water soluble or water emulsifiable.

5. An adhesivizing agent for mediating adhesion between inorganic oxide material and polymers comprising a copolymer formed by polymerizing at least two different constituents, each having two chain carbon atoms; a first of said constituents being linked to a carboxylic acid moiety through an oxygen atom of said carboxylic acid moiety, said acid moiety having a substituted carbon atom in α-position to said carboxylic acid moiety, said substituted carbon atom being substituted by an acrylic or methacrylic acid moiety; and a second of said constitutents having an alkoxysilyl moiety linked to one of the chain carbon atoms of said second constituent directly or through a group

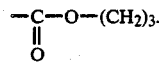

6. The adhesivizing agent of claim 5, further comprising a third constituent containing two chain carbon atoms and being joined neither to a halogen carboxylic acid moiety nor to an alkoxysilyl group.

7. The adhesivizing agent of claim 6, wherein said third constituent is carboxylic acid vinyl ester; maleic acid, its esters or anhydride; or acrylic or methacrylic acid or its ester.

8. The adhesivizing agent of claim 7, further comprising a fourth constituent with two carbon atoms in the chain and being operable to lend the polymer water solubility or water emulsifiability.

* * * * *